UNITED STATES PATENT OFFICE.

ALEXANDER A. CROLL, OF LONDON, ENGLAND.

IMPROVEMENT IN THE PREPARATION OF MATERIALS TO BE USED IN THE PURIFICATION OF GAS.

Specification forming part of Letters Patent No. 47,160, dated April 4, 1865.

*To all whom it may concern:*

Be it known that I, ALEXANDER ANGUS CROLL, of Coleman Street, in the city of London, England, engineer, have invented Improvements in the Preparation of Materials to be Used in the Purification of Gas for Illumination, part of which improvements is also applicable for disinfecting purposes; and I do hereby declare that the following is a full and exact description thereof.

The improvements relate, first, to combining neutral salts, or salts as nearly neutral as convenient, with wood sawdust, or other slightly-absorbent or cellular matter, such salts being in a concentrated form, obtained by evaporation thereof at a high temperature, and the combination with the other matters being effected generally when the salt is at such high temperature, and employing such mixture, after it has been allowed to cool, in purifying apparatus for the purification of gas. In carrying out this part of my improvements, the salts I employ are the sulphate of alumina, the chloride or sulphate of zinc, or the chloride or sulphate of manganese, or the chloride or sulphate of iron.

For the purpose of obtaining a mixture which shall remain throughout as much as possible free and open to the action of the gas until saturation thereof, and also for the purpose of obtaining valuable residual products in the most concentrated form, I prefer, when employing sulphate of alumina, to take it at a specific gravity of about 90° Twaddle, and as nearly neutral as it can be conveniently obtained in the process of manufacture, and at a temperature of about 230° Fahrenheit, and I combine it in that state with dry-wood sawdust, or with other slightly-absorbent or cellular matter; but I prefer the combination to be with wood sawdust, and in the proportion of about five parts, by weight, of such alumina with one part, by weight, of dry-wood sawdust.

When employing the chloride or the sulphate of manganese, I first evaporate either of them till it becomes semi-fluid and until the temperature thereof has attained about, say, 230° Fahrenheit, and is of a specific gravity of, say, about 120° Twaddle, when it is to be mixed with dry-wood sawdust, or with other slightly-absorbent or cellular matter; but I prefer, generally, the combination to be with the wood sawdust, and in that case I find about five parts, by weight, of the manganese to one part, by weight, of the wood sawdust answers well. I also prefer to add a small quantity of pounded chalk to the salt of manganese previous to its admixture with the sawdust, in order to neutralize any free acid which may still exist in such salt. Such neutrality is most desirable when the chlorides of any of the salts referred to are employed. Combinations such as referred to when well mixed and allowed to cool down to the temperature of the atmosphere I reduce, where necessary, so that they may be used in a dry or comparatively dry, free, and open state, and in that state placed in purifying apparatus, such as that generally used when purifying gas by dry lime or oxide of iron, and I operate upon the gas by these means after condensation thereof and before the removal therefrom of sulphureted hydrogen, which I prefer to remove by a subsequent process. A suitable purifying mixture may also be obtained by combining sulphuric acid at a temperature of about 230° Fahrenheit with roasted China clay and wood sawdust or other slightly-absorbent or cellular matter, which I well stir during the process of mixing, and I find that about seven parts, by weight, of sulphuric acid, (containing eighty per cent. of oil of vitriol,) six parts of finely-divided and roasted China clay, and two parts of dry-wood sawdust answer well; but the proportions given may be varied.

When employing a chloride or a sulphate of zinc, or a chloride or a sulphate of iron, the neutrality of such salts may readily be obtained by the introduction of metallic zinc or turnings, or other reduced portions of iron, as the case may be, to the solutions. In the case of the chloride of zinc or the chloride of iron, the evaporation may be continued until the temperature arrives at about 300° Fahrenheit. The evaporation of the sulphate of zinc and of the sulphate of iron need not be continued to above a temperature of about 230° Fahrenheit; but about double the quantity of sawdust will be required with the sulphate or chloride of zinc or chloride of iron to what is required for the salts of manganese.

When employing a chloride of zinc or of manganese or of iron a beneficial result may also be obtained by their use after the concentration and treatment thereof referred to by mixing either of such chlorides with the sawdust after being allowed to cool; but then the evaporation may be carried on until the temperature rises, say, about 20° Fahrenheit higher than when the saw-dust is mixed at a high temperature. As both the chloride of zinc and the chloride of iron are highly deliquescent salts, it will be desirable, after the preparation and mixture of either of them with the sawdust is complete, that if not immediately used in the purifiers, they be kept protected from the action of a moist atmosphere.

The combination of the chloride or the sulphate of manganese with the other matters referred to, more especially when mixed with pounded wood-charcoal in the proportions before mentioned, any free acid existing in the combination being neutralized by the addition of chalk, as already described, is secondly applicable, generally, as a disinfectant.

In the evaporation of the salts referred to surface-heat will be found the best adapted to the purpose.

Having thus described the nature of my invention, and means which I adopt in carrying the same into effect, I would have it understood that I do not confine myself to the precise details referred to, as these may be varied; but

What I do claim is—

1. The combining the neutral salts referred to, or as nearly neutral as convenient, with wood sawdust or other slightly-absorbent or cellular matter in the manner stated, and employing such mixture in purifying apparatus for the purification of gas, substantially as described.

2. The use or application of the chloride or sulphate of manganese referred to with wood-charcoal or wood sawdust, as a disinfectant.

In testimony whereof I, the said ALEXANDER ANGUS CROLL, have signed my name to this specification in the presence of two subscribing witnesses.

A. ANGUS CROLL.

Witnesses:
    ALFRED DONNISON,
                *Notary Public*,
    JAMES G. NAYLOR,
                *His Clerk.*